US010843187B2

(12) United States Patent
Jackson et al.

(10) Patent No.: US 10,843,187 B2
(45) Date of Patent: Nov. 24, 2020

(54) MICROFLUIDIC CHIP

(71) Applicant: Randox Laboratories Ltd., Crumlin (GB)

(72) Inventors: Stuart Jackson, Crumlin (GB); Martin Crockard, Crumlin (GB); Stephen Haswell, Crumlin (GB)

(73) Assignee: Randox Laboratories Ltd.

( * ) Notice: Subject to any disclaimer, the term of this patent is extended or adjusted under 35 U.S.C. 154(b) by 377 days.

(21) Appl. No.: 15/519,096

(22) PCT Filed: Oct. 15, 2015

(86) PCT No.: PCT/GB2015/053068
§ 371 (c)(1),
(2) Date: Apr. 13, 2017

(87) PCT Pub. No.: WO2016/059419
PCT Pub. Date: Apr. 21, 2016

(65) Prior Publication Data
US 2017/0225160 A1    Aug. 10, 2017

(30) Foreign Application Priority Data
Oct. 15, 2014   (GB) .................................. 1418233.1

(51) Int. Cl.
*B01L 99/00*    (2010.01)
*B01L 3/00*     (2006.01)
*F16K 99/00*    (2006.01)

(52) U.S. Cl.
CPC ........... *B01L 3/5027* (2013.01); *B01L 3/5023* (2013.01); *B01L 3/502738* (2013.01);
(Continued)

(58) Field of Classification Search
None
See application file for complete search history.

(56) References Cited

U.S. PATENT DOCUMENTS 3,561,775 A * 2/1971 Sturlason ................ F16J 15/38
277/396
2002/0172617 A1 * 11/2002 Biwa ................ B01L 3/502715
422/68.1
(Continued)

FOREIGN PATENT DOCUMENTS

EP    1258720 A2    11/2002

OTHER PUBLICATIONS

Bischoff, Laura, Written Opinion of the International Searching Authority, PCT/GB2015/053068, European Patent Office.

*Primary Examiner* — Paul S Hyun
(74) *Attorney, Agent, or Firm* — Gavrilovich, Dodd & Lindsey LLP

(57) ABSTRACT

According to the invention there is a microfluidic chip 1 that includes at least two layers 10 forming a stack of layers, each layer of which has at least one flow channel 14; a bore 16 extending through the layers and communicating with a plurality of flow channels; and a valve 20, which has a shaft 22 with a recess 222 in a side of the shaft for fluid to flow through. The shaft is rotatably mounted in the bore, and has a first position in which the recess is aligned with each of at least two flow channels of the plurality of flow channels thereby providing a flow path between the at least two flow channels, and a second position in which the recess is unaligned with at least one of the at least two flow channels the flow path between the at least two flow channels thereby being closed. This allows a fluid flow path between two flow channels to be open and closed by rotation of the shaft so that fluid in the microfluidic chip can be redirected to allow the chip to have greater capability and by using a minimal amount of space on the chip to do so.

14 Claims, 11 Drawing Sheets

(52) U.S. Cl.
CPC ...... *F16K 99/0001* (2013.01); *F16K 99/0013* (2013.01); *B01L 2300/0887* (2013.01); *B01L 2400/0644* (2013.01); *F16K 2099/0084* (2013.01)

(56) References Cited

U.S. PATENT DOCUMENTS

| | | | |
|---|---|---|---|
| 2003/0175947 A1* | 9/2003 | Liu | B01F 11/0071 435/288.5 |
| 2011/0104024 A1 | 5/2011 | Gransee et al. | |

* cited by examiner

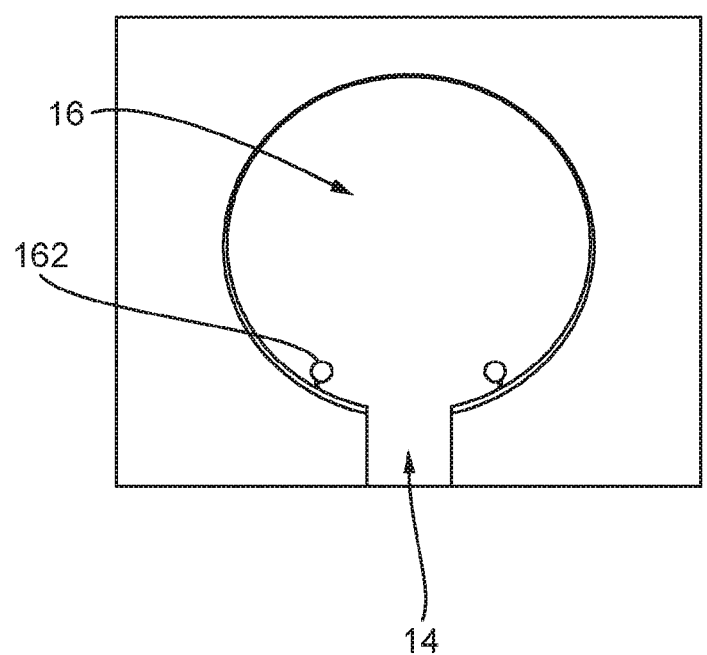

MICROFLUIDIC CHIP

CROSS REFERENCE TO RELATED APPLICATIONS

This application is a U.S. National Stage Application filed under 35 U.S.C. § 371 and claims priority to International Application No. PCT/GB2015/053068, filed Oct. 15, 2015, which application claims priority to Great Britain Application No. 1418233.1, filed Oct. 15, 2014, the disclosures of which are incorporated herein by reference.

The present invention relates to microfluidic chips. In particular, the present invention pertains to valves used in microfluidic chips.

Microfluidic chips are often used for "Lab-on-a-chip" applications where an assay is run to test a sample from a patient. A microfluidic chip may have a single layer or multiple layers with a layer having flow channels through which fluids (most commonly liquids) may pass.

In order to run an assay on a microfluidic chip, a sample is introduced to a chip and is passed through a particular path along which reagents required to complete the assay can be freeze-dried to the wall of the path. The fluids move along the flow channel due to capillary action or by using pressurised air to push the fluids along the channel. To ensure that the fluids follow the desired path for the assay to be completed, microfluidic chips use valves, actuators and other moving parts to guide and alter the path through the flow channels that the fluids follow.

The valves are used either to regulate the flow rate of the fluids or to stop the fluids from flowing by blocking the flow channel or constricting the flow channel to such an extent that fluid can no long pass along the flow channel. A number of different types of valve are used on microfluidic chips. For example, screw valves that apply pressure to a flow channel due to the axial motion when the valve is rotated are known, and piston valves that allow fluid to pass around a piston head in one position but not in another are known.

The design of microfluidic chips often requires many valves, actuators and other moving parts inside the chip. This increases the complexity of the manufacture of a chip, the cost of producing the chip and the fragility of the chip. However, these elements are required to ensure the correct sequence is followed for an assay to be completed.

With capillary action, no active interference is required to transport liquids around the chip. However, the liquid must be open to the environment to allow capillary action to occur. This can cause contamination from the environment leading to misdiagnosis if the liquids are polluted by factors introduced by the external environment. Further, the movement of liquids by capillary action tends to be slow, limited to low volume and is only effective over a short range. In addition, capillary action leads to poor mixing of fluids.

To use pressurised air, a complicated interface between the chip and the device supplying the pressurised air is required. Often, the air is not purified before it is pumped into the chip, so foreign bodies can contaminate the liquids, which again can have an effect on the outcome of the assay. Due to the pressure, liquids or vapour inside the card can leak out through the interface into the external environment causing contamination.

There is therefore a need to simplify the design of microfluidic chips and for there to be a more effective method of transporting fluids around a microfluidic chip whilst keeping the risk of contamination to a minimum.

In accordance with an aspect of the present invention, there is provided a microfluidic chip, including: at least two layers forming a stack of layers, each layer of which has at least one flow channel; a bore extending through the layers and communicating with a plurality of flow channels; a valve, having a shaft with a recess in a side of the shaft for fluid to flow through, the shaft being rotatably mounted in the bore, wherein the shaft has a first position in which the recess is aligned with each of at least two flow channels of the plurality of flow channels thereby providing a flow path between said at least two flow channels, and a second position in which the recess is unaligned with at least one of said at least two flow channels the flow path between said at least two flow channels thereby being closed.

In other words, the invention provides a valve in a microfluidic chip that is able to open and close flow paths between different flow channels by aligning or un-aligning a recess with the relevant flow channels by rotation of a shaft of the valve in which the recess is located. The invention therefore allows the connection between specific flow channels to be opened and closed on demand whilst using the minimum amount of space on the microfluidic chip.

Locating the recess in a side of the shaft additionally reduces the risks of leaks, unacceptable pressure gradients when fluids pass through the recess and alignment problems that could be experienced if other recess locations were to be used.

The recess may be configured to provide a flow path between two flow channels in the same layer. However, typically, the recess is configured to provide a flow path between two flow channels in respective different layers. This allows fluids in the microfluidic chip to be moved from one layer to another layer using the recess in the valve shaft. Therefore, the capability of the microfluidic chip is improved as, for example, more assays can be run on a single chip without needing to add a test sample to the chip at multiple locations. For example, this would be possible if each layer were configured to run a single assay.

Typically, the recess has a cross-sectional area perpendicular to the direction of flow when fluid passes through the recess that is similar to, or approximately equal to, the equivalent cross-sectional area of the flow channels. This allows pressure to be kept approximately constant when fluid passes through the recess. For example, there may be a difference in the cross-sectional areas of up to 10% or 5% of the cross-sectional area of one of the flow channels perpendicular to the direction of flow.

The use of the valve means that the number of locations at which fluids are added to the chip can be reduced as a single valve is able to direct fluids to different parts of the chip. This allows the interior of the chip to be further isolated from external factors making the assays more reliable and less susceptible to contamination as there are less unknown environmental factors. In addition to this, the number of valves in a single chip can be reduced as a single valve can be configured to control multiple flow paths instead of needing one valve per flow path that needs to be controlled. This reduces the amount of space taken up in a chip by valves allowing a greater amount of the chip to dedicated running an assay.

The walls of the recess may present a concave surface in the side of the shaft. By "concave surface", we mean a surface that opens radially inwardly from and axially along the side of the shaft. Of course, as an alternative, it would be possible for the recess to be in the form of a flat section on the side of the shaft. If the recess forms a flat section on the side of the shaft, fluid will still be able to flow through the recess when aligned with the correct flow channels. This is because the flat section will deviate from the natural (i.e.

outwardly curved) shape of the shaft. In this manner, a flat section on the side of the shaft will effectively form a hollow, and therefore a recess in the side of the shaft.

As a further alternative, the recess may, for example, be a hollow in the shaft that has sides and a back wall, and the back wall may be curved such that the back wall of the recess maintains a constant distance from a central longitudinal axis of the shaft. Such a curve will not form a concave surface, but will instead project outwards from where the sides of the recess meet the back wall so that the depth of the recess is, for example, constant with respect to the side of the shaft across the width of the recess. However, a concave surface allows an optimal quantity of fluid to be held in the recess for a given size of perimeter of the recess whilst allowing for simple manufacture. There may of course be many suitable shapes for the recess, which may or may not be concave.

The walls of the recess may form a single arcuate surface in a plane perpendicular to the central longitudinal axis of the shaft. This provides a single curved surface for fluid to pass over. In addition to the advantage caused by directing the fluid towards the centre of the recess, this reduces the potential for turbulent flow in the recess, which would slow fluid transfer through the recess.

The shaft may have a lower section at an end portion of the shaft, in which the recess is located, the remainder of the lower section having a smooth surface extending around the shaft. Having a smooth surface (by which we mean a surface that has low surface roughness) allows the shaft to be a closer fit to the bore. Whilst still allowing rotation, the closer the fit that the shaft has with the bore, the less likely it is that fluid will leak out from a flow channel into the bore and around the shaft. This is because a closer fit effectively allows the shaft to seal an end of a flow channel that opens into the bore, making it difficult for fluid to escape from the flow channel into the bore. If the surface roughness were not sufficiently low, fluid would seep out along the side of the shaft, as the topology of the side of the shaft would allow the fluid to flow into troughs in the surface and pass out of the flow channel into the bore. Instead, when the surface roughness is low there are fewer troughs, and the troughs are not as deep. Therefore, the likelihood of leakage is reduced. In view of the advantages offered by the shaft having a smooth portion, preferably, the smooth portion may have a surface roughness of up to 10 nm.

A further advantage of the smooth portion having a surface roughness of up to 10 nm is that the shaft, or at least the lower section of the shaft, is able to be made of injection moulded thermoplastics, whereas a smoother surface would need the use of flat surface composites and post-moulding finishing would be required, meaning further manufacturing steps would be used and the manufacture process would be more complex.

The recess may extend axially downwardly and open into the base of the shaft. This allows the valve to provide a path to a flow channel or layer of the microfluidic chip that is beneath the valve or to the side of the shaft at an end of the shaft. For example, this may provide a flow path into a waste reservoir or waste layer of the microfluidic chip.

The valve may further include a sleeve that is attached, e.g. adhered, to the plurality of layers, and the shaft is located coaxially within the sleeve. This allows the valve to have a part that is fixed to the layers of the microfluidic chip and provides a support mechanism, other than the bore, for the shaft.

The shaft and sleeve may have a constraint system adapted to limit or prevent axial movement of the shaft relative to the sleeve. For example, the constraint system may limit the axial movement of the shaft within a predetermined range, such as, e.g. 1 cm. This allows more precise control over the position of the shaft relative to the sleeve and relative to the layers of the microfluidic chip, as the movement of the shaft is restricted, which in turn reduces the chances of misaligning the recess with a flow channel.

The constraint system may comprise cooperating rails, each of the shaft and sleeve having a rail. The rails allow the constraint system to be made up of parts of the sleeve and the shaft. The constraint system can be made up exclusively of parts of the sleeve and the shaft, but could of course have other elements that are not part of the shaft or the sleeve. Without a need for extra parts to allow the constraint system to function, the constraint system can be simple and the manufacture of the constraint system can be simple and low cost.

It would of course be possible for the constraint system to take some other form. For example, the constraint system could be a bearing that the shaft and the sleeve engage with. However, although a bearing may be suitable in various applications of the invention, a bearing is more complex than rails, and therefore can have a higher likelihood of failure.

The constraint system may be a pair of cooperating threads. This allows for a simple connection between the shaft and the sleeve that is easy to manufacture, hard wearing and allows for reliable and repeatable rotation of the shaft relative to the sleeve with a known degree of axial movement relative to the degree of rotation of the shaft. Whilst providing a track along which rotation of the shaft can be guided, due to the helical nature of screw threads, should cooperating threads be used, the shaft will undergo axial displacement when rotated. Cooperating threads also allow the shaft to be removed for cleaning or replacement.

There may be provided a seal between the shaft and the sleeve. This provides a barrier between the shaft and sleeve, which is itself attached to the layers. As such, the bore and the flow channels are isolated from the external environment in which the chip is located by the seal and the attachment of the sleeve to the layers of the microfluidic chip. This reduces the risk of contamination of anything held within the microfluidic chip with foreign contaminants.

The seal could be one of a number of different forms of seal. Preferably, the seal is a gasket, such as an O-ring.

The seal may form a barrier between the lower section of the valve and the constraint system. This reduces the likelihood of a fluid coming into contact with the constraint system, which reduces the need to clean the constraint system.

The valve may further include a linking element adapted to couple with a microfluidic chip analyser to allow the shaft to be rotated. This allows a microfluidic chip analyser that is taking measurements from the chip to control which assays are run by directing the fluid(s) to an appropriate part of the chip, and what flow paths to open and close by rotating the shaft of the valve. This means that the microfluidic chip can be part of an automated system, and that the rotation of the shaft required to open a flow path between flow channels can be controlled by the device taking measurements from the microfluidic chip. This reduces the risk of a result of an assay being erroneously recorded, as the device taking the measurement for a particular assay will rotate the shaft to open the flow path to allow that assay, or a particular part of an assay, to be run.

The linking element further allows the valve to be operated only by rotation of the shaft. This simplifies the capabilities required of the drive mechanism used to operate the valve, and allows the components of the valve to be less robust, and so easier to manufacture since they will experience little friction and little wear during operation.

The linking element may have a plurality of polygonal ribs, each of which forms a ring around the circumference of the shaft. The ribs allow the linking element to be coupled to allowing to more reliable and repeatable rotation of the shaft.

Use of polygonal ribs improves reliability of the rotation of the shaft as the likelihood of the linking element slipping against the device to which it is coupled when rotated is reduced by providing surfaces to key against.

Preferably, each rib is hexagonal or each rib is square. Other shapes could be used, or the external surface of the ribs could have cross-hatching or be textured in another way. In essence, to improve reliability of rotation the ribs can have a shape or texture that raises the resistance to slippage by making the surface of the linking element more susceptible to friction.

There may be provided a plurality of recesses, each of which is for cooperating with at least two flow channels of the plurality of flow channels. This allows for a number of flow paths between flow channels to be established. Of course, for each flow path to be opened, a suitable recess needs to be aligned with the respective flow channels by rotating the shaft. Having a plurality of recesses does not mean that there will always be an open flow path. This will depend on the positions of the recesses and the relative positions of the flow channels. Naturally, for the same reasons, this also does not mean that there will always be a position in which all the flow paths are closed. Whether there are open and/or closed, flow paths will depend on the arrangement of the recesses with respect to each other and their positions relative to the respective flow channels with which they are alignable. Having more than one recess increases the flexibility of how many assays, or parts of an assay, are run at any one time, how many fluids are used simultaneously and where they are introduced from and the number flow paths that can be established, because of course, a single recess could be used for multiple (different) flow paths.

The recesses of the plurality of recesses may vary in length, width, depth and/or shape. This allows for flow paths of different lengths to be established and allows the recesses to be fitted round each other and to be tailored to a specific use if required.

The shaft may be made of thermoplastic, which makes the shaft simple to manufacture and resistant to the fluids with which it may come into contact.

According to another aspect of the invention, there may be provided a microfluidic valve, having: a sleeve that is attachable to a microfluidic chip; a shaft located coaxially within the sleeve and rotatable around the common axis of the shaft and sleeve, the shaft including: a recess in which fluid is able to flow, wherein by rotating the shaft, the recess is simultaneously alignable with a plurality of flow channels of a microfluidic chip to which the valve is attached to establish a flow path between the flow channels.

According to a further aspect of the invention, there may be provide a microfluidic chip, comprising: at least one layer in which is located at least one test region, the at least one layer having a flow channel, at least part of which is located in the at least one test region, the flow channel having an inlet and a mixing region between the inlet and the at least part of the flow channel located in the at least one test region, wherein the cross-sectional area of the flow channel is larger inside the mixing region than outside the mixing region.

The mixing region provides a region of the flow channel in which turbulence is more likely to occur. By controlling the flow rate and pressure in the flow channel, turbulence can be induced in the mixing zone. This makes it possible to ensure that fluids are sufficiently mixed whilst limiting the region in which turbulence can be controllably established to only one region of the flow channel whilst allowing the flow in the other parts of the flow channel to be (or to remain) laminar. Turbulence can be induced more readily in the in the mixing zone as it will have a larger Reynolds number (due to the larger cross-sectional area) than the other parts of the flow channel.

The mixing zone may have an inlet and/or an outlet that provides a gradual change in the cross-sectional area of the flow channel, such as a tapered shape. Typically however, the mixing region has an entrance and/or an outlet that provides a step transition in the cross-sectional area of the flow channel. The step transition is a sudden change in the cross-sectional area. The sudden transition assists in invoking turbulence in a flow as the fluid suddenly has to expand/contract to fill the space provided instead of having a slow increase/decrease in the volume that it must fill.

Should the entrance and/or outlet provide a tapered transition, there is a gradual change in the cross-sectional area of the flow channel providing a smooth path along which fluid can be guided. This encourages laminar flow better than a sudden or stepped change in cross-sectional area due to the gradual change in cross-section area.

Conventionally, flow channels have a consistent cross-sectional area. However, the flow channel may have a tapered portion that provides a transition in the cross-sectional area of the flow channel. Having a tapered portion in the flow channel helps to control the likelihood of turbulence in the flow with a transition from larger to smaller making it more likely that the flow will be laminar and a transition from smaller to larger making it more likely that the flow will be turbulent. Other aspects of the invention may also have a flow channel with a tapered portion.

Any tapered portion of the flow channel may have curved walls or may have flat walls.

Air or gas bubbles may become trapped or may be present inside the microfluidic chip, in particular in the flow channel(s). These may be isolated in the mixing zone. Additionally, the mixing zone may have a filter adapted to allow the passage of gas out of the mixing zone. Gas bubbles can interfere with the result of an assay, so isolating them in the mixing zone and allowing them to be removed allows more confidence in the results produced by an assay. The gas bubbles may become isolated in the mixing zone due to the shape of the mixing zone (e.g. the tapered outlet), but could be isolated in the mixing zone by other means.

The flow channel may be straight, curved or follow another path shape. However, typically the at least part of the flow channel (that which is located in the at least one test region) has a serpentine form. This allows for the greatest length of channel in a given area meaning the size of the chip can be kept to a minimum whilst allowing long channel lengths. Having long channels also means that a longer distance is available over which to mix fluids when required.

There may just be one test region, though typically, there are at least two test regions (which may, for example be connected together). This allows a more complex assay or a number of assays to be conducted using a single chip.

The at least one layer may be translucent in at least a portion of the location in the layer where the at least part of the flow channel passes through the at least one test region. This allows measurements to be taken from fluids that emit light by chemiluminescence therefore removing a need to have sensors, probes or measuring devices embedded in or inserted into the microfluidic chip. Of course, if there are multiple layers in the microfluidic chip, one or more of the layers may be translucent whilst still producing the same advantage.

The microfluidic chip may have at least a first layer and a second layer, the mixing zone providing a flow path between the first layer and the second layer. This means that the transition from one layer to another is in a region where the smoothness of the walls of the flow path is of lesser importance. Ordinarily, the walls should be smooth so as not to induce turbulence in the flow. However, a purpose of the mixing zone is to induce turbulence, so a rough section or an artefact on a wall of the mixing zone will cause less unwanted disruption. Furthermore, this allows the mixing region to have a larger volume in which to mix fluid flowing through the flow channel.

Embodiments of the invention are described in detail below with reference to the accompanying figures, in which.

Figure 10A:
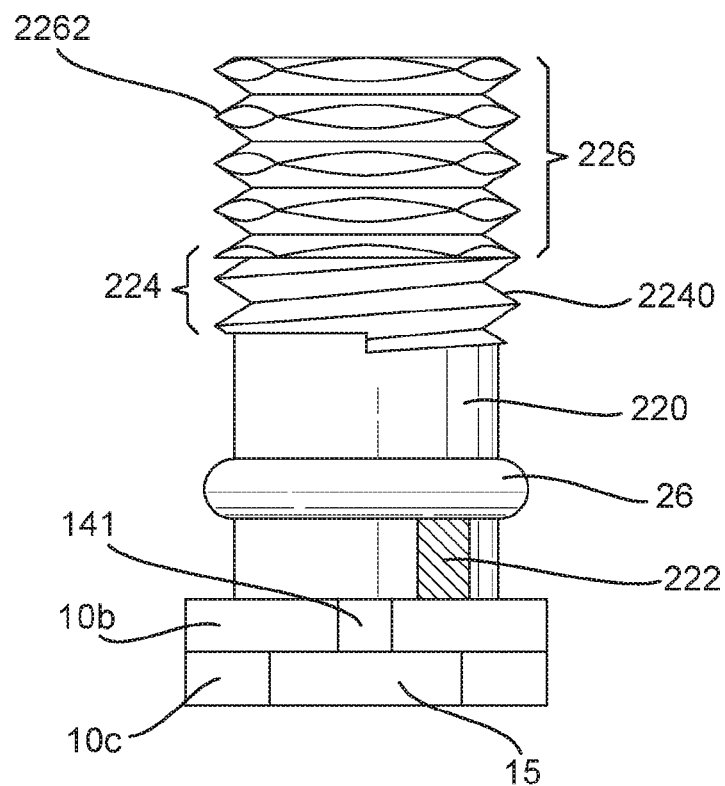
Figure 10B:
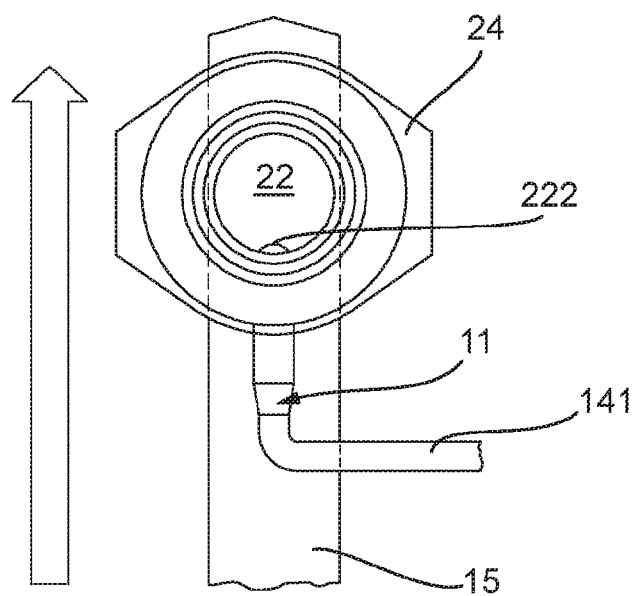
Figure 11A:
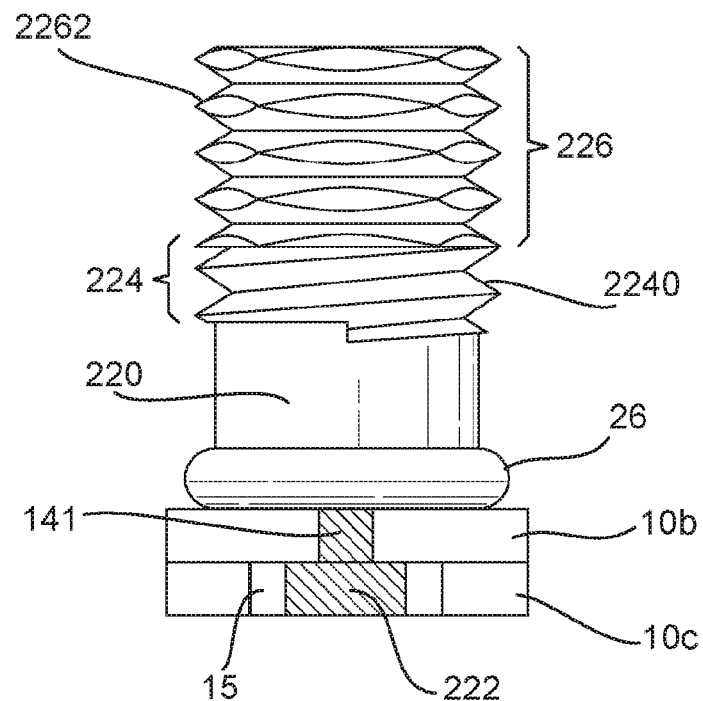
Figure 11B:
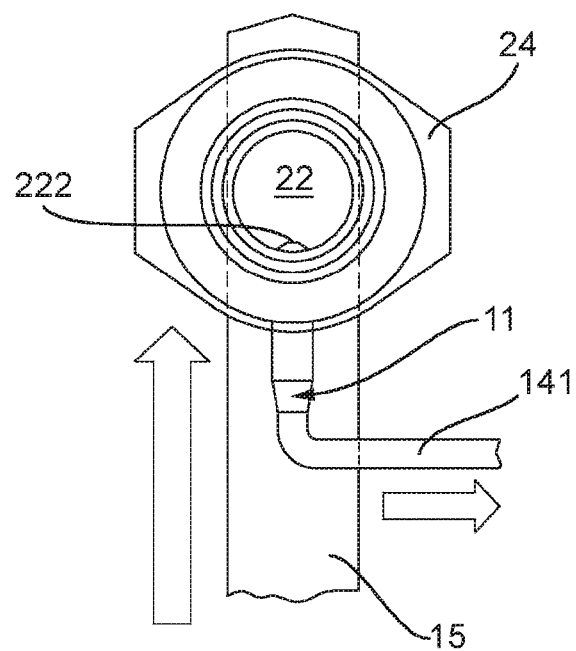

FIG. 10a and FIG. 10b respectively show an example side view of a portion of the invention in a first position and an example plan view of a portion of the invention in a first position;

FIG. 11a and FIG. 11b respectively show an example side view of a portion of the invention in a second position and an example plan view of a portion of the invention in a second position; and FIG. 12 shows a plan view of a part of an embodiment of the invention.

The microfluidic chip of an embodiment is configured to be a lab-on-a-chip. The microfluidic chip is able to run an entire assay on the chip. This includes having test regions, reagents and washes on the chip. The chip is not limited to running a single specific assay, and is able to run one of any number of assays, including molecular diagnostics assays that require PCR (Polymerase Chain Reaction) and assays that require multiple fluids in different volumes, mixing of fluids and transport of fluids over long distances.

To start and end an assay, the chip needs to interface with a reader or analyser.

Readers/analysers are known machines that interface with microfluidic chips to control the processes being run on the chip and to take and assess results. The microfluidic chip of the invention can be used on its own with a small analyser machine capable of interfacing with a single chip, or can be used with multiple other similar or identical chips in a larger analyser machine.

In an embodiment of the invention, the microfluidic chip has few features, and in particular has no electronics or heater elements on-board. However, it would be possible to include these if they were required. The lack of electronics or heater elements, and the minimal number of features means the chip is robust, simple to manufacture and suited to rough transport. The microfluidic chip is also made of materials that are able to accommodate and withstand temperature cycling without deformation or damage. For example, the layers of the microfluidic chip may be made of glass or plastics, such as polypropylene.

Figure 1:
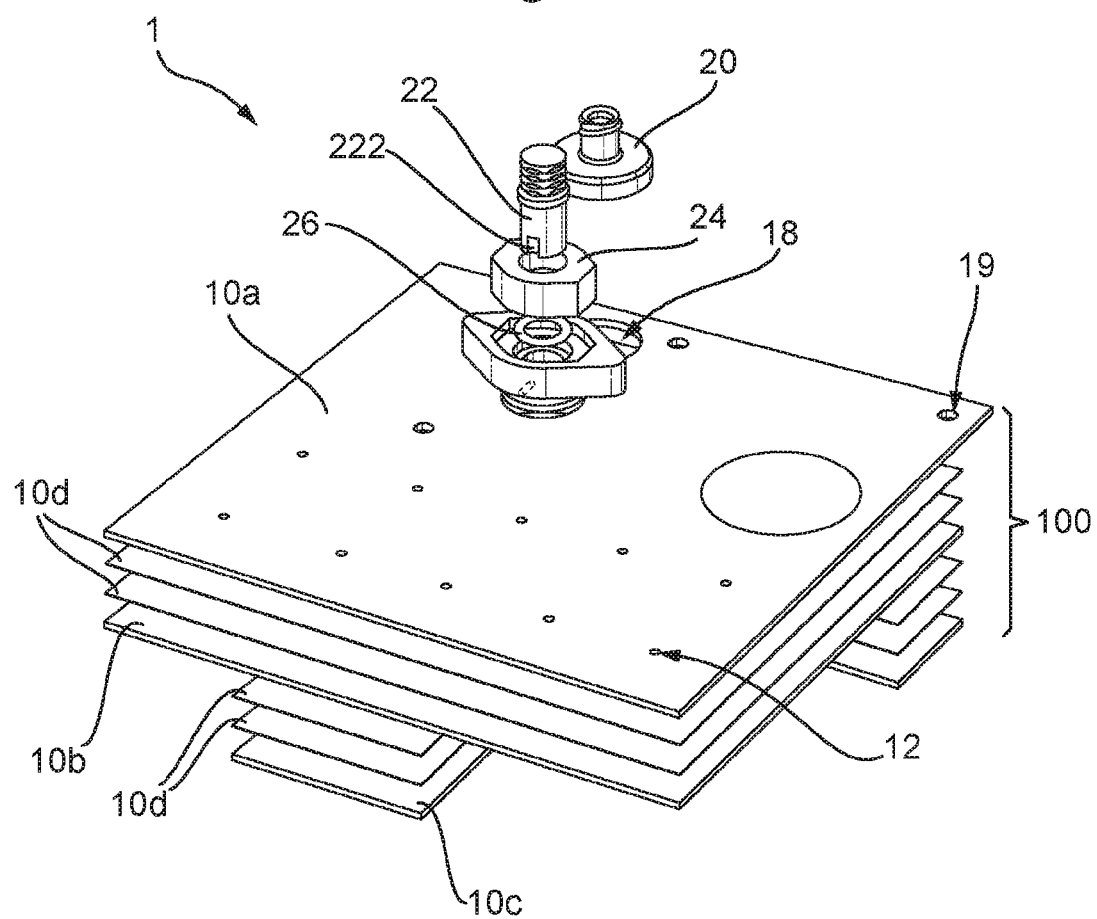
FIG. 1 shows an exploded perspective view of an embodiment of the invention.

As shown in FIG. 1, the body of the microfluidic chip 1 is made up of multiple layers 10. The layers are stacked on top of each other to form a card 100, which can then be clamped to an analyser (not shown). A number of layers have at least one flow channel through which fluid is able to flow. Conventionally, lab-on-a-chip cards predominantly carry and use liquids, but in some circumstances, gases can be passed along the flow channels, for example when using air/gas pressure to push liquids along the flow channels.

The layers 10a, 10b and 10c of the microfluidic chip that have flow channels and/or inlets for fluids have malleable layers 10d sandwiched between them. These reduce the chance of leakage from a layer as fluid passes along a flow channel. The malleable layers may be made of transparent flexible material, films and/or foils. The malleable layers relieve stress that can build when the chip is clamped into a mechanical vice (such as a vice on an analyser), and then heated, as the flexibility of these layers allows the chip to retain its form and reduce the chances of leaking from the flow channels.

The top layer 10a on the top surface of the microfluidic chip shown in FIG. 1 has ports 12 through which reagents may be introduced into the flow channels in the chip. The ports allow reagents to be introduced into the microfluidic chip by syringe pumps, pipettes or other devices that are able to hold and expel liquids or to feed liquids to a particular location. Alternatively, blisters (shown in FIGS. 6 and 7) can be used to introduce fluids into the chip through the ports.

When blisters are used, they are located on the chip and are filled during the manufacture/preparation process of the chip. The blisters are breakable by actuators on an analyser that push the fluid contained within a particular blister into the flow channel for that blister. This is described in more detail below. Of course, other fluid introduction devices could be used instead of syringe pumps, pipettes or blisters. This will depend on what device a particular analyser has for introducing reagents to a chip. It is also possible to add reagents to a microfluidic chip during the manufacture process. This is commonly done by putting dried reagent on a wall of a flow channel.

As well as acting as a site for the introduction of fluids to the chip, a port can act as a site for the expulsion or removal of fluid from the chip. For example, one port may act as a backpressure relief valve, and may be a one-way valve. This will allow gases to be expelled from the chip when the pressure within the chip, or within a layer in the chip, is too high.

Any excess fluid is transferable to a waste reservoir (not shown) that forms part of the analyser. However, it would be possible to keep excess fluid on the chip, for example by having a waste layer as one of the layers of the chip.

Figure 2:
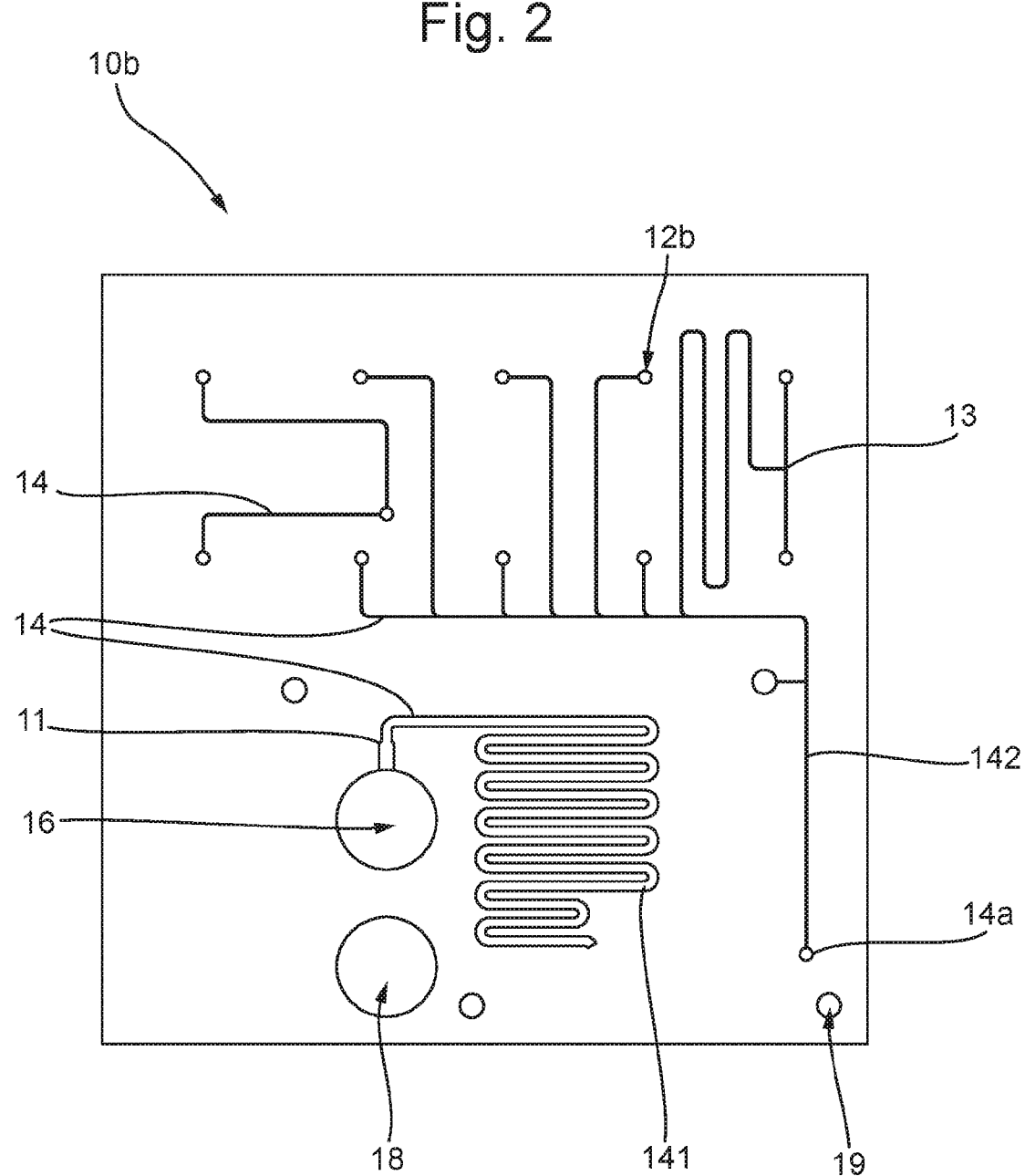
FIG. 2 shows a cross-sectional plan view of a layer of an embodiment of the invention.

As shown in FIG. 2, which shows a cross-sectional plan view of the central layer 10b of the microfluidic chip (therefore showing the internal structure of the layer), each port 12 in the top layer 10a feeds directly into an inlet 12b for flow channels 14 in the layer 10b in the chip.

FIG. 2 shows a number of flow channels 14 located in the layer 10b. The shape of a particular flow channel, or flow channels depends on the purpose of the flow channel(s). There is a flow channel 141 shown in FIG. 2 that has a serpentine-like shape (for example, a flow channel with a number of parallel sections that are joined at alternate ends by a 180-degree bend, or U-turn, in the channel) and has a large cross-sectional area. For example, the flow channel 141 may be 1.300 mm wide by 0.050 mm in height, therefore having a cross-sectional area of 0.065 mm$^2$ (millimetres squared). Instead of having a rectangular cross-section, it would of course be possible to have a different shaped cross-section, such as circular or elliptical.

The size of the flow channel 141 encourages turbulent flow in the channel. As such, when fluid is pushed through the flow channel 141 at sufficient speed, the flow will be turbulent. This is because fluid passing through the channel will have a larger Reynolds number than in a narrower flow channel. The flow rate of a fluid and the pressure exerted on a fluid are controllable in the microfluidic chip, so turbulent flow can be implemented by raising the flow rate to a sufficient threshold velocity. Having turbulent flow allows two or more fluids to be mixed together effectively along the path length.

Because of the serpentine-like shape, the flow channel 141 in FIG. 2 has a long path length within a small footprint. For example, the flow channel 141 may have a path length of 241.5 mm in a 576.0 mm$^2$ area (e.g. an area equivalent to a square with sides that are 24.0 mm in length). Having a long path length within a small footprint is useful if freeze-dried material is placed along the flow channel as it enables efficient mixing of the freeze-dried material with a fluid when there is a need to keep the footprint of a flow channel to a minimum. The mixing of a dried reagent can also be assisted by turbulent flow in the flow channel.

For space efficiency reasons, flow channels intended to transport a fluid from one location to another are straight or have a few bends as possible. However, when there are many flow channels, the flow channels can have more bends in order for the most efficient arrangement to be arrived at; much like a printed circuit board layout is planned and implemented.

As shown in FIG. 2, the layers also have aligned apertures defining a bore 16 in which a shaft 22 of a valve 20 (shown in FIG. 8) is able to be positioned. The layers also have a second set of aligned apertures defining a second bore 18 in which a sample introduction conduit 30 is locatable. The sample introduction conduit is able to interface directly with an analyser to allow the analyser to introduce a sample to the microfluidic chip. Alternatively, the sample introduction conduit can be made use of by a user, such as, for example, a medical practitioner, to introduce a sample to the chip before placing the chip in an analyser.

The flow channel 141 provides a flow path that is in communication with the bore 16. However, the cross-sectional area of an entrance of the flow channel to the bore is larger than that of the majority of the flow channel. This is because there is a tapered portion 11 (also shown in FIG. 10b and FIG. 11b at a larger magnification). The tapered portion provides a transition from a larger cross-sectional area at the bore to a smaller cross-sectional area. The reduction in the cross-sectional area will increase the flow rate.

FIG. 2 also shows a junction 13 where two fluids are able to be mixed. Fluids are introduced at the inlet to the two flow channels that meet at the junction. By pushing fluids along these flow channels, the fluids are forced together at the junction causing them to mix and pass through the rest of the flow channel circuit in combination. Other junctions (whether T-shaped as this junction 13 is, or shaped otherwise) can be used to mix further fluids together.

Figure 3:
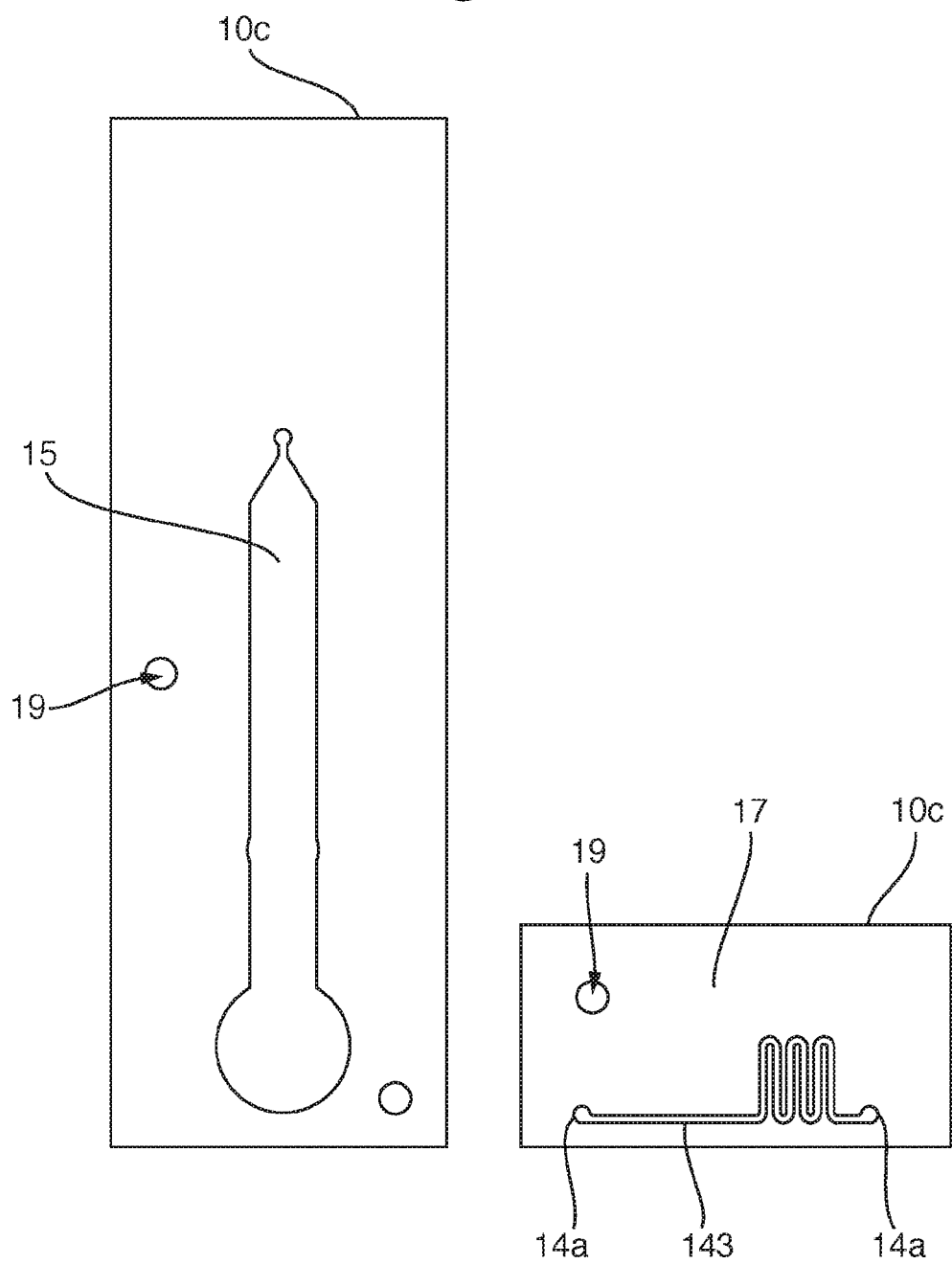
FIG. 3 shows a cross-sectional plan view of a layer of an embodiment.

FIG. 3 shows a cross-sectional view through a lower layer 10c of the microfluidic chip. In this embodiment, the layer is made up of two pieces. In other embodiments, the lower layer 10c may be made of one of more pieces. One piece of the base layer has an extraction region 15. The extraction region is a section of the layer that has been etched out. The extraction region is located at the base of the bore 16. The extraction region 15 is used to collect various fluids and can be used to mix fluids before they are transported to other parts of the microfluidic chip. Multiple flow channels feed into the extraction region. This includes a channel from the sample introduction conduit 30 and can also include channels from the ports 12 so that the sample and the reagent(s) can be mixed depending on the configuration of the microfluidic chip.

The extraction region 15 contains magnetic beads (not shown). The magnetic beads are treated so that fluid adheres to the surface of each bead. The magnetic beads are able to be moved by a magnetic field that the analyser is able to raster along the extraction region 15. The magnetic field can be altered and moved by the analyser. This allows the magnetic beads to be moved along the extraction region, which causes the fluid that is adhering to the beads to mix with other fluid in the extraction region. To disassociate the fluid from the beads a reagent is introduced into the extraction region to overcome the adhesion between the fluid and the magnetic beads.

The microfluidic chip also has biomarker test regions within the lower layer 10c. Each biomarker test region forms a specific part of an assay and is contained in the other piece of the lower layer 10c shown in FIG. 3. A test region for a particular biomarker will be a region in which a particular combination of reagents will have been introduced to a sample by the time it arrives at that region of the card. The combination of reagents used will allow for a result indicative of a particular biomarker to be assessed and recorded by the analyser due to hybridisation of the sample and reagent(s).

Part of an assay may require the sample (and the mixed reagents) to be heated. As such, this piece of the lower layer 10c is a thermal region 17, which has a serpentine-like flow channel 143 that holds the fluid over a heater on the analyser. Heating can cause chemiluminescence, which is detectable by a camera on the analyser. To be able to detect chemiluminescence and conduct suitable analysis on the light emitted, the light needs to be visible outside of the chip. To ensure the light is visible outside of the chip, the lower layer 10c and/or other layers have an optically transparent or translucent region (not shown) through which light is able to pass.

The serpentine-like flow channel 143 in the lower layer has a smaller cross-sectional area than the serpentine-like flow channel 141 in the central layer 10b. For example, the flow channel 141 may be 0.6500 mm wide by 0.0500 mm in height, therefore having a cross-sectional area of 0.0325 mm$^2$. As with the larger serpentine-like flow channel, instead of having a rectangular cross-section, it would of course be possible for the flow channel to have a different shaped cross-section, such as circular or elliptical. The smaller cross-sectional area makes it possible for fluid flowing through the narrower flow channel 14d to have a lower Reynolds number, which makes turbulence less likely. The length of the serpentine-like flow channel 143, may, for example, be 48.0 mm in a 16.8 mm$^2$ area.

Fluid is able to be passed into the serpentine-like flow channel 143 from the ports 12 without passing through the extraction region 15. This is done by passing fluid along a flow channel 142 that passes directly from the inlets 12*b* (see FIG. 2) to the serpentine-like flow channel 143. There is an interface between the central layer 10*b* and the lower layer 10*c* that provides a fluid flow path between the two layers; this is located at the point where this flow channel 142 meets the flow channel 143 in the thermal region of the lower layer 10*c*. At the interface there is a 'mixing zone' 14*a* (see FIGS. 3 to 5).

There are two mixing zones 14*a* in the microfluidic chip (although there may be less, or more, if the chip configuration requires it). One mixing zone is located between the serpentine-like flow channel 141 in the central layer 10*b* and the flow channel 143 in the lower layer 10*c*, and the other mixing zone is located between the flow channel 142 from the inlets 12*b* and the flow channel 143 in the lower layer. Each mixing zone has an entrance from the respective flow channel in the central layer 10*b* and an outlet to the flow channel 143 in the lower layer 10*c*. Each mixing zone has a larger cross-sectional area in the flow path than the flow channels at the respective entrances and outlets. Essentially, each mixing zone provides a region in an overall flow channel (which may be made up of multiple flow channels) with a larger cross-sectional area than the other parts of the overall flow channel.

The larger cross-sectional area of each mixing zone encourages turbulence in the flow passing through the respective mixing zone, which, when it occurs, mixes the fluid. When passing from a mixing zone into the flow channel 143 in the lower layer 10*c*, any turbulence induced decreases and the flow settles to a laminar flow. This is because the cross-sectional area decreases from that of the mixing zone.

If a fluid is mixed on entering the flow channel 141 in the lower layer 10*c*, the test regions across which the flow channel passes will be exposed to a consistent fluid mixture. This means there will be a reduced bias or delta (i.e. error) in a sample captured by one test region at the start of the channel in comparison with a test region at the end of the channel. The possible low Reynolds number in this flow channel also means that when the fluid mix is exposed to a heat source there is a high degree of confidence that each component of the fluid will receive the same amount of heating. In particular, this means that PCR will be very efficient.

Alternatively, if the fluid is not premixed when entering the flow channel 143 in the lower layer 10*c* (this will mean the flow has to be laminar flow when passing through the mixing zone, which is possible through control of the flow rate and pressure), it is possible to expose the test regions to a number of fluids in a desired order. This is because only a small amount of mixing between two adjacent fluids then occurs at the boundary between the two fluids. This mixing is dominated by natural diffusion. An assay can therefore be tailored so that specific test regions are exposed to specific fluids at specific times. Specific fluids can also be exposed to heat at a particular time.

Figure 4:
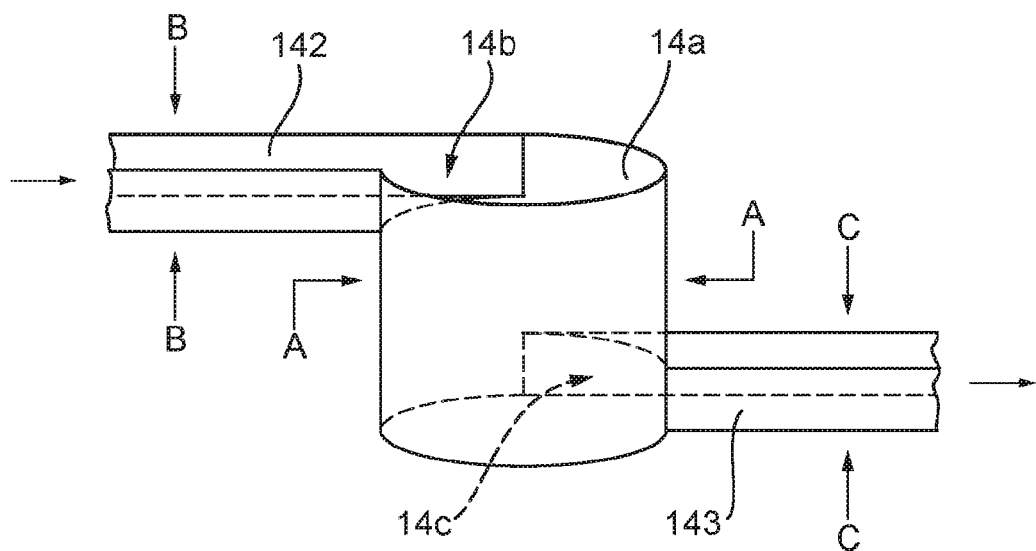
FIG. 4 shows a schematic view of an example mixing zone.

The shape of the mixing zone also assists in encouraging turbulence and controlling the amount of turbulence (or lack thereof). A schematic of one mixing zone 14*a* is shown in FIG. 4. This shows the mixing zone 14*a* between the flow channel 142 in the central layer 10*b* and the flow channel 143 in the lower layer 10*c*. This mixing zone has a cylindrical form. In part, this is due to it providing the interface in the overall flow channel from one layer to another. The mixing zone 14*a* between the serpentine-like flow channel 141 in the central layer 10*b* and the flow channel 143 in the lower layer 10*c* has similar features.

The mixing zone shown in FIG. 4 has a larger cross-sectional area than the flow channels 142 and 143 with which it is in communication. The cross-sectional area is the area perpendicular to the flow path through the mixing zone. By this, we mean the path in FIG. 4 through flow channel 142, into the cylinder, along the length of the cylinder and out though flow channel 143. In other words, the cross-sectional area of the mixing zone is the area of the cylinder in plane A-A in FIG. 4. For example, this cross-sectional area may be 2 mm$^2$.

The flow channel 142 in the central layer 10*b* is in communication with the mixing zone 14*a* by an entrance 14*b*. The entrance 14*b* is a step transition. As such, the entrance has an immediate transition from the cross-sectional area of the flow channel 142 (the area in plane B-B) to a cross-sectional area that is significantly larger. This sudden change in cross-sectional area encourages the formation of vortices in the flow, establishing turbulence. Instead of having a step transition, the entrance may provide an alternative type of transition, such as a tapered transition that allows for a gradual transition from the flow channel to the mixing zone. Having a taper would provide a gradual increase in the cross-sectional area, which may help maintain a laminar flow.

The flow channel 143 in the lower layer 10*c* is in communication with the mixing zone via an outlet 14*c* to the mixing zone. The outlet is also a step transition, from the cross-sectional area of the mixing zone to that of the flow channel (the area in plane C-C) which allows a laminar flow to be (re)established. Alternatively, the outlet could provide a tapered transition. Should a tapered transition be provided at the outlet (i.e. a gradual decrease in the cross-sectional area), this also helps to (re)establish a laminar flow in the flow channel at the outlet to the mixing zone 14*a*.

The transition in size of the flow channel from a flow channel with a larger cross-sectional area to a flow channel with a smaller cross-sectional area, through the mixing zone performs a function of promoting mixing of fluids passing through the channels and mixing zone whilst ensuring a continuous flow of fluid.

Additionally, the mixing zone may be used as a region in which to isolate air/gas bubbles that have become trapped in the card. The mixing zone has a filter (not shown) through which any gas trapped in the mixing zone can be removed. As gas bubbles can cause disturbances in the results of an assay, isolating and removing gas bubbles is advantageous.

Figure 5:
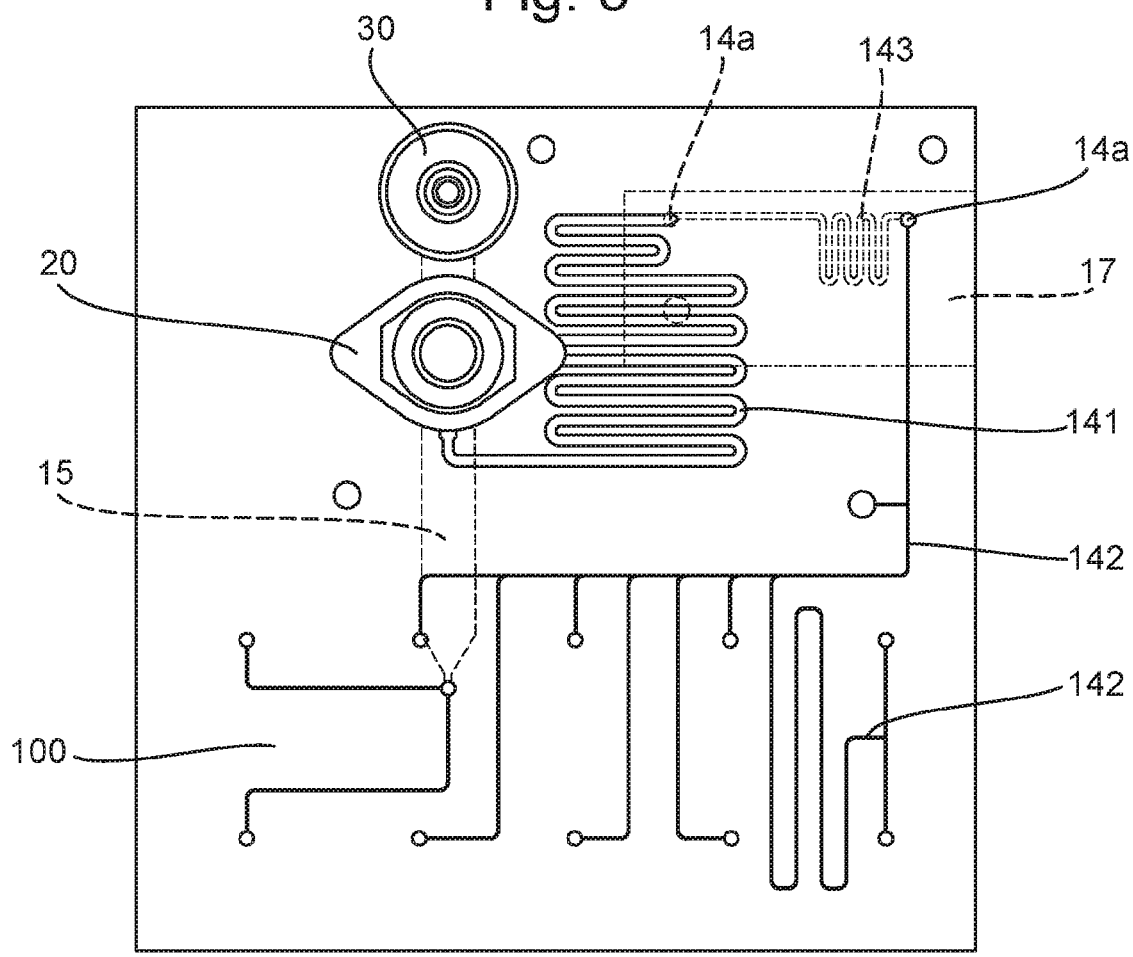
FIG. 5 shows a transparent plan view of an embodiment of the invention.

FIG. 5 shows a plan view through multiple layers of an embodiment, showing the internal configuration of multiple layers. This shows the top layer, central layer and lower layer, as well as the valve 20 and the sample introduction conduit 30, each of which are located in respective bores formed by an aperture in each layer. FIG. 5 also shows a thermal region 17 as part of the lower layer, which is located below the top layer and central layer.

As a chip is able to run a particular assay, it needs to be distinguishable from chips that run different assays. In addition to this, one chip may have different components from another chip. This means that to be able to correctly start, end and analyse an assay and control a chip, an analyser needs to be able to identify which assay the chip is configured to perform and which components the chip has. To do this, the chip has alignment features, which, in this case are made up of holes 19 through the various layers of the microfluidic chip. The alignment features allow the chip to be positioned correctly relative to an analyser, and allow the analyser to use the correct automation to ensure the correct running of the chip.

In FIG. 5, the top layer has ports 12 for the introduction of reagents into the flow channel 143 in the lower layer. The reagents can be introduced into the flow channels directly, or indirectly by being directed through the extraction region 15.

When directed into the extraction region 15, the fluid is then able to be directed to the flow channel 141 to further mix the fluids. However, when passing directly into the flow channel 143 in the lower layer, the fluids are often pumped through the various other flow channels.

As described above, the ports 12 can have blisters filled with fluid located above them, which are able to be burst to allow fluid to pass through the ports and into the flow channel 143 (see, for example, FIG. 5 described below). The blisters are burst as part of the pumping process, which is enabled by means of actuators. The actuators 1010 (see FIG. 6) push fluid held in the blisters into an inlet to the flow channel 142 from the reservoir.

Figure 6:
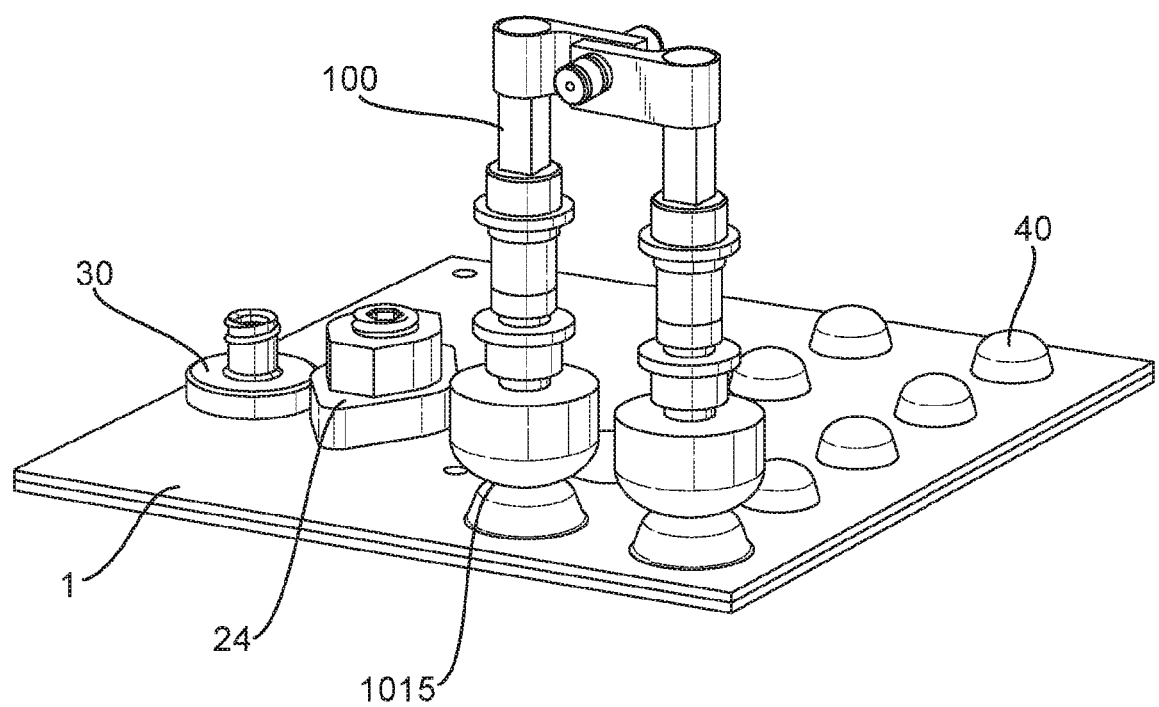
FIG. 6 shows a perspective view of a microfluidic chip.
Figure 7:
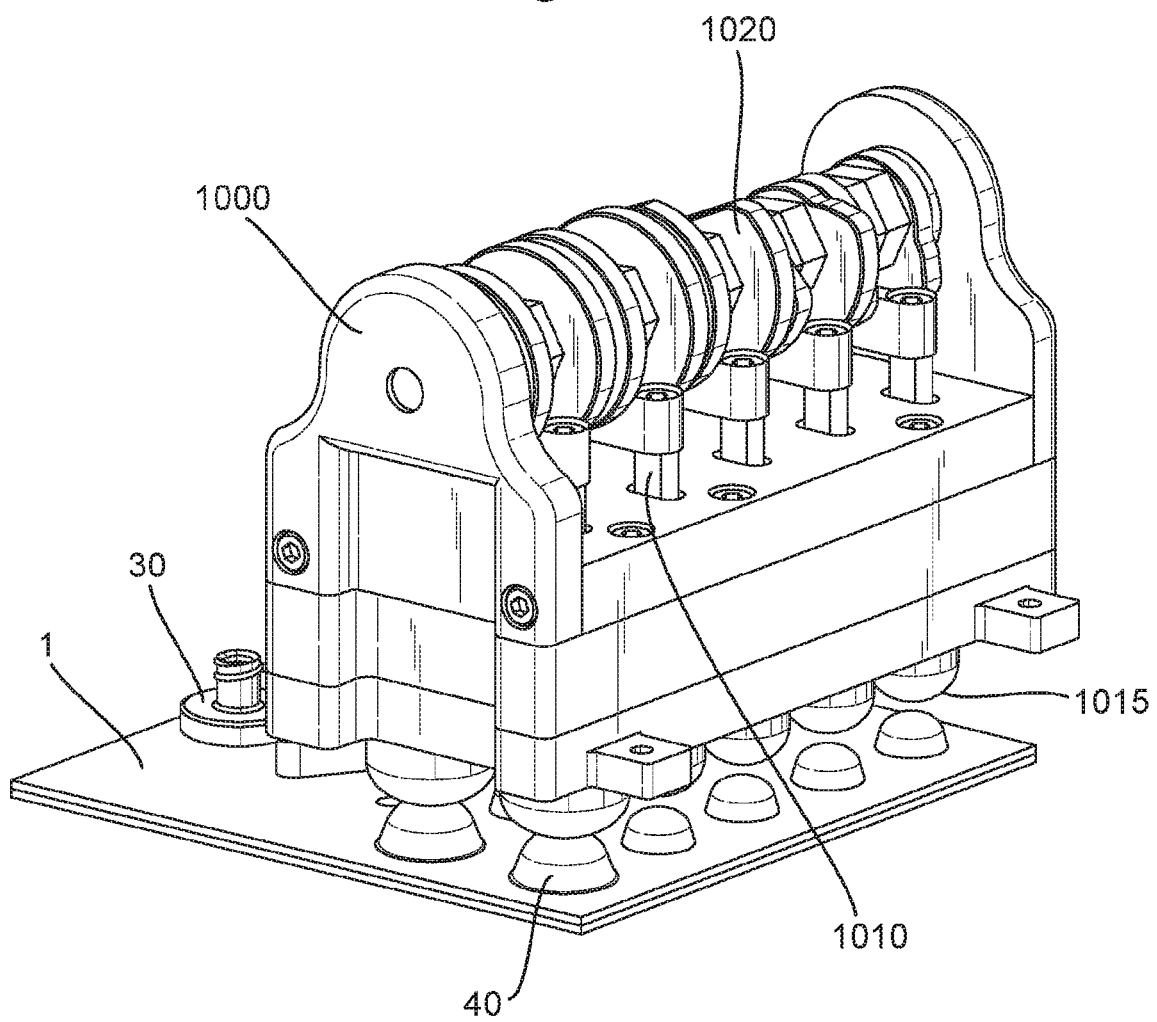
FIG. 7 shows a perspective view of a microfluidic chip with part of a microfluidic chip analyser

FIG. 6 shows the microfluidic chip 1 with a number of blisters 40. Each blister is a reservoir, and is located over one of the ports 12 (not shown in FIG. 6). The actuator 1010 forms part of a microfluidic chip analyser (not shown). The actuator has a shaft with an enlarged head that acts as a tip 1015. The actuator is moveable by means of a cam 1020 (see FIG. 7). The cam 1020 is rotatable and, due to the shape of the cam, it is able to push the actuator towards the chip 1. On release of the pushing force from the cam, the actuator is able to return to its original position. The movement of the actuator towards the chip 1 causes the tip 1015 of the actuator to exert pressure on the blister 40 with which it is in contact. Exerting pressure on the blister causes the fluid contained within the blister to be pushed through the port over which the blister is located. This usually occurs only when the pressure exerted is above a threshold pressure, as there is a membrane between the interior of the blister and the port, which breaks on the application of pressure above a particular threshold.

The cam causes a movement of the actuator 1010 at a known speed and by a known amount. This means the amount of force that is applied by the actuator to the blister is known or calculated, and so the resulting pressure and flow rate of the fluid pushed through the port into the flow channel can be calculated. By using a different cam (for example on a different blister), the amount of pressure exerted can be changed. This is done by having a rack 1000 of cams, each of which is able to move an actuator.

Further details on the cams, actuators and rack including how the movement of the actuators is controlled and the type of movement produced is disclosed in the UK Patent Application GB1320542.2.

Figure 8:
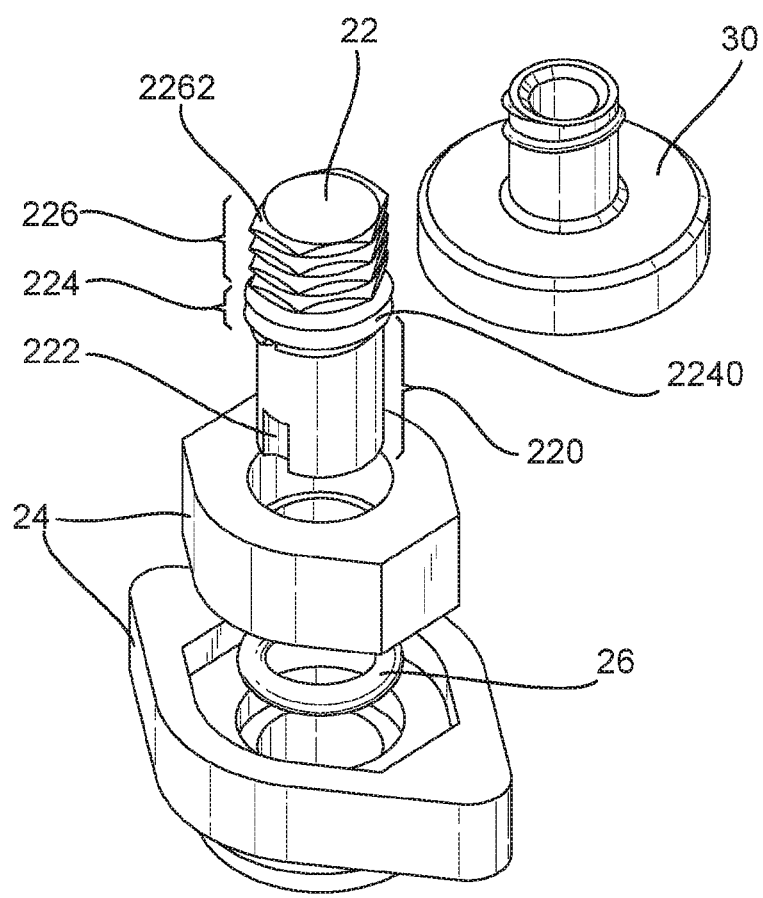
FIG. 8 shows an exploded perspective view of the valve and sample introduction conduit of an embodiment of the invention.

In order to direct fluids around the chip when fluids are not pumped through the chip by means of the actuators, a valve is located in the bore 16 extending through the layers of the microfluidic chip. As shown in FIG. 8, the valve has a shaft 22. The shaft is a single piece cylinder of which there are three identifiable sections. Of course, the shaft could be made of multiple pieces.

Broadly speaking, the sections of the shaft includes an upper 226, middle 224 and lower 220 section of the shaft 22. The upper and lower sections are each located at respective opposite end regions of the shaft 22, and the middle section is located between the two end regions and is close to, but not necessarily centred on, overlapping or located over, the mid-point along the length of the shaft.

Figure 9A:
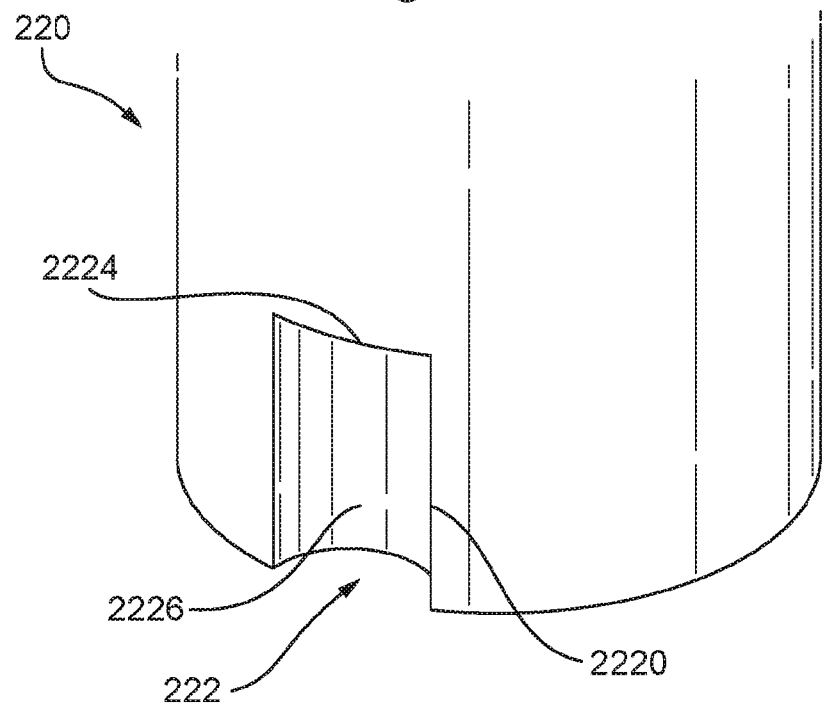
FIG. 9a shows a perspective view of an end portion of a shaft of an embodiment of the invention.
Figure 9B:
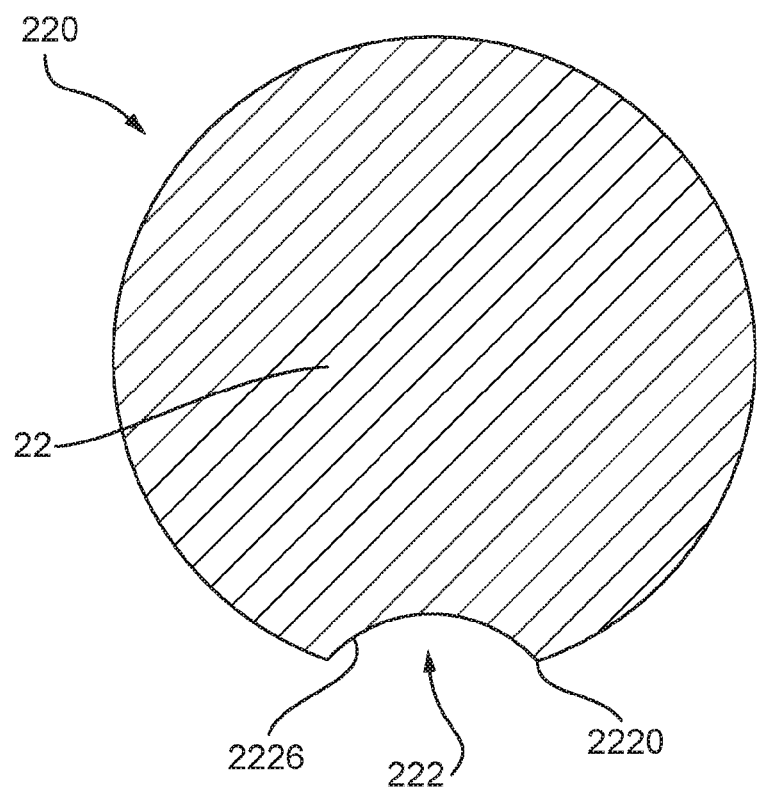
FIG. 9b shows a cross-section of an end portion of a shaft of an embodiment of the invention.

The lower section 220 of the shaft 22 has a smooth surface 221 that has a surface roughness of up to 10 nm. There is also a recess 222 found in the lower section (see FIG. 9a). The recess 222 has a rectangular perimeter with the long side 2220 orientated in the same direction as the length of the shaft 22. One of the short sides 2224 of the recess is located at the end of the shaft, and opens into a base of the shaft. In other words, the recess extends from a point on the lower section 220 of the shaft to the base of the shaft. The recess has a concave wall 2226 across its width that forms a single arcuate surface. This means the recess is essentially an open sided cylinder with an open end. The concave wall 2226 curves up to meet the edges at the sides of the recess, this forms a sharp edge at the sides of the recess. The concave wall has a constant radius of curvature and describes an arc or a circle corresponding to a quarter of the circumference of a circle (see FIG. 9b). Of course, the amount of a circle that is described by the concave wall may be different, or the radius of curvature can vary across the width of the wall, and the curvature can be based on a shape other than a circle (for example, it could be based on a more eccentric ellipse than a circle). The wall opposite the opening into the base of the shaft is planar. However, this could be a different shape. For example, it may be curved.

The recess could be in a different position on the lower section 220, and indeed, there could be more than one recess. The recess would be in a different position if the flow channels for which it was to provide a flow path between were located in a different position relative to the lower section of the shaft In addition, the axially extending opening (i.e. the perimeter) of the recess(es) does not have to be rectangular. Instead the opening(s), or a number thereof, could, for example, be circular, square or have a step shape. The recess(es) may have a different orientation such as, for example, having the longer dimension (when rectangular) running across (i.e. around) the shaft instead of along the length of the shaft, or having the longer dimension running diagonally along the shaft. Of course, should the recess(es) have a step shape, sections of the recess will run along the length of the shaft and (other) parts will run across the shaft to form the step shape. The orientation of each recess will be dependent on the flow channels the respective recess is providing a flow path between.

Should the recess(es) be a shape other than rectangular, the recess(es) may still have a curved surface that is suitable for the shape of the recess. For any shape of recess, instead of having a curved surface, the recess(es), or a number thereof, may have a number of flat walls that form a concave surface. For example, a recess may have a concave wall that may comprises three or more flat surfaces. As a further alternative, the wall of a recess may be flat thereby forming a flat surface on the lower section of the shaft which deviates from the curved surface of the shaft. This will still allow fluid to flow through the recess. However, should the recess only have a flat surface, there will be a higher likelihood of fluid leaking out from the recess. If the back of the recess is set back from the surface of the shaft, the back surface of the recess may have a curve that is complimentary to the curve of the surface of the shaft. In other words, the back surface of the recess may be curved outward to follow the curve of the shaft.

The middle section 224 of the shaft is a threaded section with a screw thread 2240, as shown in FIG. 8. The screw thread 2240 provides a guide rail that cooperates with a screw thread on the sleeve in which the shaft is coaxially held. This provides the ability of the shaft to be rotated relative to the sleeve, which in turn causes the shaft to be rotatable relative to the layers of the microfluidic chip. When rotated, the screw thread causes the shaft to move axially as well as rotate. This is due to the screw thread being helical. The screw thread provides a system for connection the shaft and the sleeve that is simple to manufacture, makes assembly of the valve easy and provides a secure connection between the shaft and the sleeve.

The upper section 226 of the shaft has a linking element to which an analyser couples to rotate the shaft. The linking element has a number of ribs 2262 (shown in FIG. 8) that are axially adjacent to each other at an end portion of the shaft that is at an opposite end of the shaft to the end portion at which the lower portion 220 is located. The outer perimeter of each rib is hexagonal. The hexagons are all aligned, by which we mean that the vertices of each hexagon aligns with the hexagons of the adjacent ribs forming a single hexagon shape around the edge of the shaft when viewed along the axis. The hexagonal shape of the end portion of the shaft provides teeth against which an actuator on an analyser may gain a purchase in order to rotate the shaft. Of course, it would be possible for the ribs to have another polygonal shape, such as, for example, triangular, square, pentagonal or octagonal. A more simple shape would, for example, be circular. However, this would make it more likely that an analyser actuator would slip over the shaft when trying to rotate the shaft, whereas a polygonal shape reduces this risk. More complex shapes than a hexagon can be used. However, a balance would need to be struck between the reduction in likelihood of slippage versus the complexity of the shape and therefore the difficulty to manufacture.

As noted above, the shaft 22 is connected to a sleeve 24 (shown in FIG. 8) by the screw thread 224. The sleeve is used to hold the shaft; it has a bore through it and is removably keyed to a fixing 25. The fixing 25 is adhered to the exposed layer at the surface of the chip and has a portion that extends into the bore 16 in the chip. This portion ensures that the location of the fixing 25 does not change relative to the bore. As the sleeve and fixing are separable, the O-ring 26 is able to be removed and cleaned or replaced. When the parts of the valve are assembled, the O-ring is sandwiched (in other words, fitted between) the sleeve and the fixing and is urged against the shaft when the shaft is in place. Due to the adherence of the fixing to the exposed layer at the surface of the chip and the keying of the sleeve to the fixing, the shaft is held in place relative to the layers and the bore 16.

There is an O-ring 26 (shown in FIG. 8) around the lower section 220 of the shaft between the recess 222 and the screw thread 224 (for example, see FIG. 10). When the shaft 22 is located in the sleeve 24, the O-ring forms a seal between the shaft and an interior wall of the sleeve. This stops or limits the ability of fluid to pass from the lower section 220 of the shaft to the screw thread 2240, upper section 226 and out of the sleeve. This also works in the other direction to stop or limit foreign bodies from passing from the outside of the sleeve to the smooth portion. This limits contamination by the fluids in the chip of the external environment and contamination of the fluids in the chip by foreign bodies from the external environment.

As shown in FIG. 5 and FIG. 6, the sleeve sits on, and is attached to, the top layer 10a of the microfluidic chip 1. This allows the shaft to sit in the bore 16 in the layers 10. The shaft is a close-fit with the side of the bore. The close-fit between the shaft and the side of the bore limits fluid flow around the shaft, only allowing fluid to flow through the recess, and not into the bore between the shaft and the side of the bore. In the embodiments shown, the fit between the shaft and the side of the bore is such a close-fit that the shaft is in contact with, but able to slide relative to the side of the bore. In this manner, the O-ring provides a seal to isolate the lower section of the shaft and the inside of the bore from the external environment, and the fit between the shaft and side of the bore provides a seal around the sides of the recess.

The bore for the valve passes through multiple layers of the chip due to multiple layers having aligned apertures, and at least two of the layers have flow channels that communicate with the bore (see, for example, FIG. 10 and FIG. 11). By this, we mean that the flow channels have an (open) end that opens onto the bore. Of course, other layers may have flow channels that open onto the bore and any layer may have one or more flow channels that communicate with the bore.

In the example shown in FIG. 10 and FIG. 11, there are two layers shown, the central layer 10b and the lower layer 10c. Each of the two layers has a flow channel 141, 15, which are located one above another. The flow channel 15 in the lower layer 10c is the extraction region where a sample and reagents are mixed, and which holds the magnetic beads. Therefore, the extraction region is connected to the sample introduction conduit 30 and to the flow channels from the ports 12 through which the reagents are introduced to the microfluidic chip 1. The flow channel 15 (i.e. the extraction region) is at the base of the bore in which the shaft of the valve is located and crosses the base of the bore (see FIG. 9), so the lower layer 10c has two openings onto the bore (although it could only have one). The central layer 10b has a flow path that may lead to a detection region, or to some other part of the chip.

In use, the wanted fluids are introduced into the extraction region and are mixed. During this time, the shaft 22 is held in a first position (shown in FIG. 10). In the first position, the recess 222 is un-aligned with either of the two flow channels 141 and 15. In the example shown in FIG. 10 and FIG. 11, in the first position, the shaft is also held above the flow channel 15 in the lower layer 10c so as not to block the flow channel 15 in the lower layer 10c. In the first position, the recess is located against a side of the bore with no flow channel opening. In this manner, no fluid flows through the recess 222.

As shown in FIG. 10 and FIG. 11, the O-ring 26 is located above the recess 222. This presses against the side of the bore or against the side of the sleeve (not shown) forming a seal through which fluid flow is restricted.

When fluid is to be directed into the flow channel 141 in the central layer 10b, the shaft 22 is rotated into a second position (shown in FIG. 11). In the second position, the recess 222 is aligned with flow channels 141, 15 in the central layer 10b and the lower layer 10c. Due to the pressure exerted by pushing fluid into the flow channel 15 in the lower layer 10c, the fluid is pushed through the recess 222 and into the flow channel 14b in the central layer 10b. The fluid then passes into and through the flow channel 141 in the central layer 10b. In the example shown in FIG. 10 and FIG. 11, rotating the shaft 22 lowers the shaft to the base of the bore. This blocks the communication of the flow channel 15 in the lower layer 10c through the bore. The shaft 22 lowers due to the screw thread 2240 on the middle section 224 of the shaft, which raises the shaft when rotated one way or lowers the shaft when rotated the opposite direction.

FIG. 10b and FIG. 11b show the tapered portion 11 of the flow channel 141. When fluid enters the flow channel 141 from the valve it passes through the tapered section and the flow rate increases due to the reduction in cross-sectional area of the flow channel.

As an example, in use, in the instance where fluids are contained in a blister on the microfluidic chip, the chip is inserted in to the analyser and the analyser clamps the chip into place. During clamping, the analyser interfaces with the screw valve. When the assay is run, the blisters are burst by mechanical actuators, which pushes liquid into the extraction region to mix with the magnetic beads held in the extraction region. The sample introduction conduit relieves the pressure caused by the introduction of the fluids from the blister. When the sample is introduced through the sample introduction conduit, it mixes with the fluids in the extraction region. A magnet is then rastered across the extraction region, to pull the magnetic beads through the extraction region to collect the sample, which adheres to the treated surface of the beads. The magnet is then drawn back to one side of the valve, and the valve is turned to connect the extraction region to the rest of the microfluidic circuit. Reagents are added to dissociate the sample from the beads. This causes a pressure build up as more fluid has been added as the path to the sample introduction conduit is now blocked by the valve. This causes the fluids to wash into the microfluidic circuits. The sample then mixes with freeze-dried reagents on the way to a biochip, where it hybridises to discrete test regions. Further reagents are added from the opposite direction toward a waste chamber beyond the sample introduction valve (i.e. from the direction in which the fluids from the extraction region are flowing). The sample then undergoes heating until detection of signal by CCD camera from chemiluminescence of the test regions.

As noted above, the valve 20 is not limited to having only one recess. Indeed, it would also be possible for one recess to allow fluids from one flow channel to flow into two separate flow channels that may be in the same layer as each other (and/or the flow channel from which the fluids are flowing) or may be in different layers from each other (and/or the flow channel from which the fluids are flowing). The recess does not have to be at the base of the shaft, it just has to be able to connect the source of the fluid to the intended destination of the fluid.

As an alternative, or as an addition to having the O-ring to form a seal to keep the fluids isolated from the external environment, there may be a gasket 162 on the side of the bore 16 as shown in FIG. 12. The gasket 162 is located around an opening of a flow channel 14 onto the bore 16. There may of course be a separate gasket 162 for each opening of a flow channel onto the bore, or there may be a number of gaskets around one or more of flow channels that open onto the bore. The gasket 162 around the flow channel opening presses against the smooth portion of the shaft (not shown in FIG. 12) creating a seal locally around the flow channel opening. The gasket 162 allows the shaft of the valve to be rotated, but stops fluid leaking past the defined channel of the flow channel and the recess when aligned with the flow channel.

It would of course be possible to have multiple valves in the microfluidic chip. This means that there would need to be a bore for each valve that was to be included in the chip, but this could also be included.

The invention claimed is:

1. A microfluidic chip, including:
    at least two layers forming a stack of layers, each layer of which has at least one flow channel;
    a bore extending through the layers and communicating with a plurality of flow channels;
    a valve, having a shaft with a recess in a side of the shaft for fluid to flow through, the shaft being rotatably mounted in the bore, wherein
        the shaft has a first position in which the recess is aligned with each of at least two flow channels of the plurality of flow channels thereby providing a flow path between said at least two flow channels, and a second position in which the recess is unaligned with at least one of said at least two flow channels such that the flow path between said at least two flow channels thereby is closed, and
        wherein the valve further includes a sleeve that is attached to the plurality of layers, and the shaft is located coaxially within the sleeve, the shaft and sleeve having a constraint system adapted to limit or prevent axial movement of the shaft relative to the sleeve, the constraint system comprising a pair of cooperating threads.

2. The microfluidic chip according to claim 1, wherein the walls of the recess form a concave surface, and/or the walls of the recess form a single arcuate surface in a plane perpendicular to the central longitudinal axis of the shaft.

3. The microfluidic chip according to claim 1, wherein the shaft has a lower section at an end portion of the shaft, in which there the recess is located, the remainder of the lower section having a smooth surface extending around the shaft, and wherein the smooth surface has a surface roughness of up to 10 nm.

4. The microfluidic chip according to claim 3, wherein the recess extends axially downwardly and opens into a base of the shaft.

5. The microfluidic chip according to claim 1, wherein there is a seal between the shaft and the sleeve.

6. The microfluidic chip according to claim 5, wherein the seal is a gasket.

7. The microfluidic chip according to claim 6, wherein the gasket is an O-ring.

8. The microfluidic chip according to claim 1, wherein there is a seal between the shaft and the sleeve and the shaft has a lower section at an end portion of the shaft, in which the recess is located, the remainder of the lower section having a smooth surface extending around the shaft, the seal forming a barrier between the lower section of the valve and the constraint system.

9. The microfluidic chip according to claim 1, wherein the valve further includes a linking element adapted to couple with a microfluidic chip analyser to allow the microfluidic chip analyser to rotate the shaft.

10. The microfluidic chip according to claim 9, wherein the linking element is an end portion of the shaft that is exposed from the plurality of layers and is grippable by the microfluidic chip analyser, wherein the linking element has a plurality of polygonal ribs, each of which forms a ring around the circumference of the shaft.

11. The microfluidic chip according to claim 1, wherein the recess is configured to provide a flow path between two flow channels in respective different layers.

12. The microfluidic chip according to claim 1, wherein the shaft includes a plurality of recesses, each of which is for cooperating with at least two flow channels of the plurality of flow channels, and wherein the recesses of the plurality of recesses vary in length, width, depth and/or shape.

13. The microfluidic chip according to claim 1, wherein at least one of the at least two flow channels with which the recess is aligned when in the first position has a serpentine form.

14. The microfluidic chip according to claim 1, wherein at least one of the at least two flow channels with which the recess is aligned when in the first position has a tapered portion that provides a transition in the cross-sectional area of said at least one of the at least two flow channels.

* * * * *